United States Patent
Roell

(10) Patent No.: US 6,397,641 B1
(45) Date of Patent: Jun. 4, 2002

(54) SUPPLEMENTAL FUNCTION ELEMENTS

(75) Inventor: Friedrich Roell, Biberach (DE)

(73) Assignees: Stefan Achter, Moenchengladbach; Viktor Nikolaus Achter, Koeln, both of (DE)

(\*) Notice: Subject to any disclaimer, the term of this patent is extended or adjusted under 35 U.S.C. 154(b) by 0 days.

(21) Appl. No.: 09/857,073

(22) PCT Filed: Dec. 1, 1999

(86) PCT No.: PCT/DE99/03853

§ 371 (c)(1),
(2), (4) Date: Aug. 10, 2001

(87) PCT Pub. No.: WO00/32860

PCT Pub. Date: Jun. 8, 2000

(30) Foreign Application Priority Data

Dec. 1, 1998 (DE) .......................................... 198 55 540

(51) Int. Cl.[7] ................................................. D04B 1/22
(52) U.S. Cl. ........................................... 66/170; 66/196
(58) Field of Search .......................... 66/170, 171, 196, 66/198, 202; 297/218.1

(56) References Cited

U.S. PATENT DOCUMENTS

| | | | | |
|---|---|---|---|---|
| 5,215,807 A | \* | 6/1993 | Day et al. | 66/170 |
| 5,577,398 A | \* | 11/1996 | Jeffcoat | 66/170 |
| 5,626,037 A | \* | 5/1997 | Jeffcoat | 66/170 |
| 5,749,247 A | \* | 5/1998 | Jeffcoat | 66/170 |
| 5,802,882 A | \* | 9/1998 | Girard et al. | 66/170 |
| 5,887,452 A | \* | 3/1999 | Smith et al. | 66/170 |
| 5,992,185 A | \* | 11/1999 | Leeke et al. | 66/170 |
| 6,134,923 A | \* | 10/2000 | Lay et al. | 66/170 |
| 6,151,926 A | \* | 11/2000 | Leeke et al. | 66/170 |

\* cited by examiner

*Primary Examiner*—Danny Worrell
(74) *Attorney, Agent, or Firm*—Smith-Hill and Bedell

(57) ABSTRACT

A method of producing a two-ply knit for a seat cover in a flat bed machine includes knitting tightly with a front needle bed in a first group of wales, with a rear needle bed in a second group of wales, and with the front needle bed in a third group of wales, where the second group is between the first and third groups, and knitting loosely with the rear needle bed in the first group of wales, with the front needle bed in the second group of wales, and with the rear needle bed in the third group of wales.

8 Claims, 1 Drawing Sheet

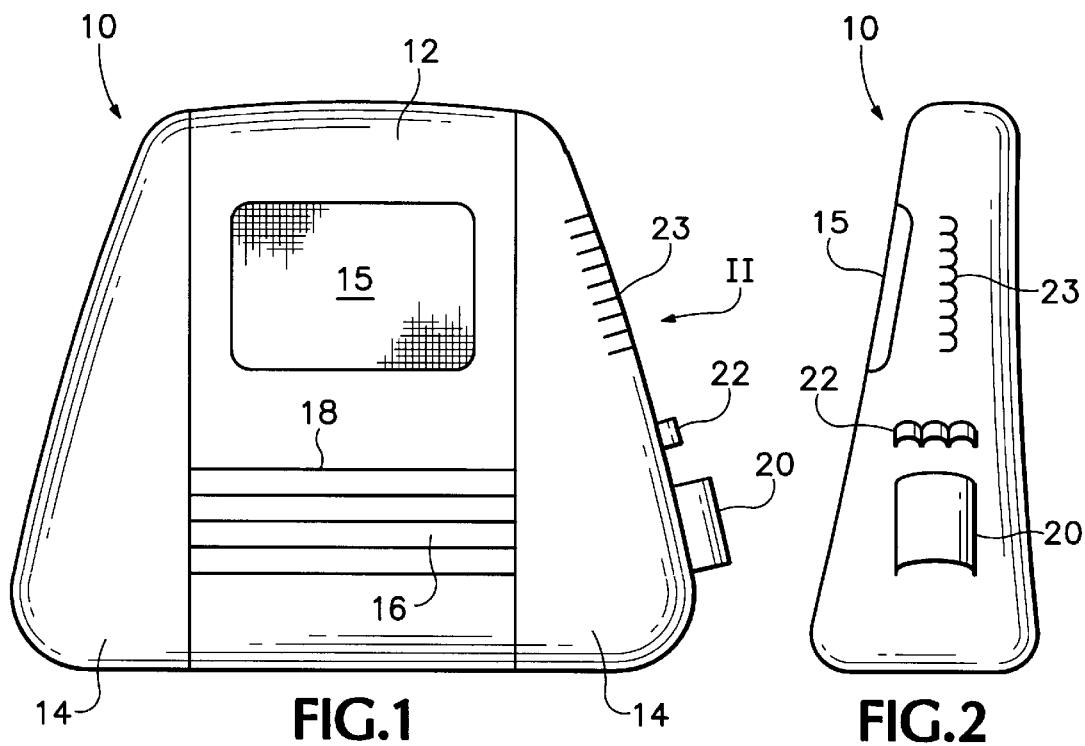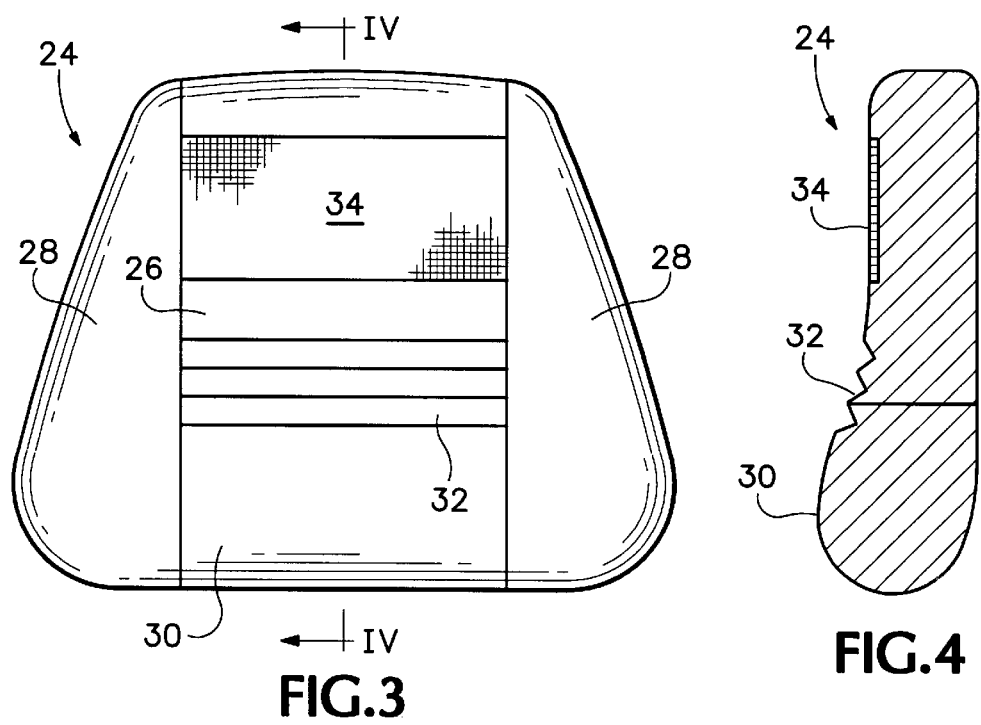

SUPPLEMENTAL FUNCTION ELEMENTS

TECHNICAL FIELD AND BACKGROUND OF THE INVENTION

The present invention relates to a seat cover knit and to a method of producing same and to a seat cover.

Fully fabricating seat covers as a knitted, three-dimensionally contoured part is well known in prior art, one such seat cover being described, for example, in European patent 0 361 855. The method as disclosed thereby permits knitting conventional seat covers. However, it is particularly in the field of individualized seat production that there is a requirement for incorporating individual function elements in the seat cover, more particularly by retrofitting sets. Prior art techniques have hitherto failed to make this possible.

SUMMARY OF THE INVENTION

It is thus the object of the invention to provide a knit satisfying individual requirements as to patterning, configuration or function elements.

Seats, especially vehicular seats, i.e. in aircraft, motor vehicles, speed boats or trains, nowadays often make it possible to elongate the seating surface area forwards to make for added seating comfort. This is why a front portion of such a seat permits forwards adjustment to enable the length of the seating portion to be set. Hitherto this problem was solved, as far as the seat cover is concerned, by providing the adjustment part with a separate cover. This, however, results in dirt being able to collect between the adjustment part and the remainder of the seat which not only spoils the visual appeal but could also possibly obstruct the adjustment function. In accordance with the invention this adjustable part is now included in the covering afforded by the seat cover, a concertina- or bellows-type folded structure being provided therein in the region of the arrangement of the adjustable part, i.e. as a rule parallel to an outer edge of the seat cover, which is automatically pretensioned in a contracted position to thus concertina-extend to permit covering added seating length when the adjustment part is extended. For this purpose, depending on the production direction of the seat cover, knitting is omitted alternatingly on either the front and rear needle bed, whilst between these linear portions knitting is done with both needle beds over several, i.e. for example five to one hundred courses. This technique results in a concertina structure parallel to the courses due to more courses existing in the knitted portions of the face/back ply than in the back/face ply, producing portions opposingly curved. If the concertina-type configuration is required to run parallel to the wales, knitting is done at the corresponding wales so that on the front and rear needle bed the knitting is alternatingly loose or close or knitted/non-knitted and vice-versa. This is achievable by the differingly loop-sinking the needles of the flat bed machine. Here too, a portion over several, e.g. five to a hundred wales is provided between the curved portions in which knitting is done uniformly with both needle beds to thus produce a concertina-type structure parallel to the wales. The structure can thus be knitted integrated in the portion of especially optional outer edges of a seat, thus eliminating the need to produce separate covers for moving parts of the seat.

In producing the concertina-type structure parallel to the wales it is also possible—in addition to alternatingly close/loose knitting in the ballooned (loose knitted) ply—to transfer additional loops from the rear needle bed or to divide loops or, where necessary, to insert a weft, warp or pile thread for added volume.

A further problem in seat production, especially vehicular seats, is ensuring proper climate control of the seat cover by airing it to remove heat and moisture. For this purpose a seat cover is provided in accordance with the invention as a dual or multi-ply knit, the plies of which are joined together by a least one pile thread. The threads on the exposed side of the knit are formulated to absorb no water to thus ensure that the exposed side of the cover remains dry. The pile thread and/or the backing knitting ply contain, however, microfibers, which due to their high capillary effect have a high moisturizing capacity, this thus being very effective in directing moisture from the exposed side to the backing side of the cover where it can be removed, for example, by providing suitable airing means. This results in the exposed side of the knit never "sweating" even under prolonged seating in unfavorable climatic conditions, e.g. in summer.

It is likewise usual nowadays in engineering comfort vehicular seating, in motor vehicles, aircraft or trains, to provide tray and retaining structures to safely accommodate oddments such as e.g. beakers or pens and pencils. In tailoring seats to occupant stature it may also be desirable to cushion the cover at defined locations, e.g. for lumbar support. This is why in accordance with the invention a cylindrical loop or pocket-shaped retaining structure, e.g. for a beaker holder or a pad pocket can be produced in the knitted cover on a flat bed machine by the retaining structure, e.g. the pocket or a cylinder, being transferred as a prefabricated part, e.g. by a comb into the knitted portion or knitted in a separate portion, e.g. on a separate bed of the flat bed machine in knitting the seat cover for subsequent transfer to the desired location on the needles of the knitted portion of the seat cover for knitting into the cover. The retaining structure can also be produced directly together with the seat cover, whilst the action of the other needles knitting the cover is disabled. It is in this way that by prefabricating or simultaneously knitting the retaining structure that the running time of the knitter is extended only unsubstantially whilst still making it possible to additionally knit complex retaining structures such as pockets, cylinders or loops in the cover without requiring any subsequent textile finishing (e.g. stitching) or tailoring, thus making the method of production extremely cost-effective by being automatable.

When the retaining structure is required to feature a certain degree of stability, the entire retaining structure may be knitted, for example, with a thermal curing thread, i.e. which is thermally treated to cure after production of the cover.

By means of the aforementioned method, pockets for optional incorporating in seat covers, e.g. in the lumbar region of the backrest can be produced, into which a foamed pad or the like can be inserted to adapt the seat geometry to individual requirements.

Automotive engineering is tending more and more to assign functions to the seat, this having started with securing seat belt buckles to the seat. Nowadays, seats must also be capable of accommodating further safely means such as e.g. the complete seat belt system. Side air bags are also now being integrated in the seat. The present invention provides a knitted seat cover for this purpose which features a covering portion for an air bag integrated in the seat. For this purpose a course and/or a wale is knitted centrally, where possible, in the covering portion of the air bag using threads having a defined burst strength, i.e. the burst strength of this thread being less than that of the thread used in the remaining portion of the seat cover. On the one hand, this engineers the seat cover to precisely burst at the predefined course or wale, on deployment of the air bag, since it is in this portion that the burst strength of the knitted cover is significantly diminished as compared to that of the remaining portion of the cover. On the other, precisely defining the burst strength of the thread ensures that the knitted cover reliably bursts on deployment of the air bag. This effect can be further enhanced by knitting portions of the knit surrounding the defined burst course or corresponding wale with a thread having a higher burst strength and/or less elasticity. Preferably the knit is knitted in the covering portion of the air bag also with a lower absolute elasticity, e.g. smaller than 15%. This prevents the knitted cover from deforming exclusively in the covering portion, prior to deployment of the air bag, which could otherwise detriment proper functioning of the air bag. Preferably the burst strength of the thread in the selected course or selected wale is but a 1/20th to a 1/4 of the burst strength of the thread in the remaining covering portion.

Where the design bursting location for deployment of the air bag is required to run in the region of a wale, use is made preferably of the intarsia technique in which knitting is done in the two portions on both sides of the wale with two first thread guides supplying a yarn of high burst strength, and in the region of the wale with a second thread guide supplying a thread of defined lower burst strength.

Fibers suitable for producing threads of defined lower burst strength are PVC spun fibers (thermovyl), fluorofilament yarns, phenyl-formaldehyde spun fibers, normal-class viscose filament yarn, Cupro spun fibers, casein fibers as well as Ca-Algin filament yarn. The dtex of the mono- or multifilament thread should be less than 300 dtex, better less than 150 dtex, whilst the dtex of the surrounding knit should preferably exceed 500 dtex.

It is particularly the trend in high-performance deluxe motor vehicles to conceal technical elements failing to satisfy elevated visual appeal requirements as such. The present invention makes this possible by integrating interior lighting in a knit, e.g. by providing it integrated in the seat or in side cladding or headlining. For this purpose at least one optical fiber is incorporated in the knitting, inserted either as a conventional looping thread or as an additional looping thread and/or as weft and/or warp thread. At least one end of the optical fiber is then connected to a beam source. It is in this way that the lighting element can now be integrated in the cladding or covering textile without it being exposed to view as such. Preferably a plurality of optical fibers is incorporated in the form of a weft or warp, e.g. by loop transfer or tucking. The ends of the optical fibers are bundled and ported into the beam source bundled. This has the advantage that rupture of any one optical fiber does not result in the complete integrated luminary being ruined. If the optical fiber is to be included in the loop of the knitting, it is preferably coated with a siliconized lubricant to facilitate it being knitted in on a flat bed machine. Thin flexible fibers of. glass or epoxy resin are preferably employed for the optical fibers, this technique additionally offering the advantage of the knit otherwise consisting of a thread tinted to harmonize with the color scheme of the vehicle interior, whereby the complete lighting element is thus invisible in daylight and not becoming evident until nightfall.

As a rule, a seat cover is produced two-ply which, for one thing, permits allocating the technical functions and visual appeal functions to the rear and face ply respectively, and, for another, enhances the stability of the knit as a whole. The two plies of the knit are joined together by differing ways and means, e.g. by transferring loops from one needle bed to the other or by a pile thread structure or by mutual looping or tucking. In accordance with the invention it is now possible to provide a pocket, e.g. for inserting a seat pad, by very simple and thus cost-effective ways and means by disjoining two plies in the region of the pocket. This results in a pocket being formed between the two plies which serves a variety of functions, e.g. receiving a seat pad. Preferably the loops are stitched on a front needle bed at an edge of the disjoint open to the face, backing or both sides of the knit to thus produce a slit in the knitting for access to the interior of the pocket. The loops at the edge of the disjoint can be knitting alternatingly or additionally with a thermothread and subsequently thermally treated to prevent the loops opening up in the edge portion of the slit. The slit may also be covered or concealed by an integrated tab simply included in the knit by single-ply knitting on a needle bed.

There is, of course, no need to knit the complete seat cover multi-ply, it being basically sufficient to knit the seat cover two-ply in the region of the pocket in the directly adjoining portion so that it can also be provided in an otherwise single-ply knitted cover.

The last aspect of the present invention relates to a problem inherent to synthetic textile seat covers, namely electrostatic charging. To prevent this happening the seat cover in accordance with the invention comprises to advantage on the side facing the seat cover frame a material which is electrically conductive or resistively conductive. Thus, any static electricity resulting from friction between clothing and the seat cover is grounded via the seat cover frame to vehicle ground. This prevents static electricity materializing with its known undesirable accompanying effects. Preferably the electrically conductive or resistively conductive material is in contact, via the backing of the seat cover, with a metal part of the seat cover frame to produce the electrical ground, although it is just as possible to connect the conductive portions directly to a metal part of the vehicle, be it a motor vehicle, aircraft or train.

Preferably the electrically conductive or resistively conductive material is integrated in the knitted cover as a knitted thread to thus permit incorporating the material either looped, filled or as warp or weft thread. This technique has the advantage that the conductive locations can be precisely defined with no subsequent coating procedure being necessary which could possible negatively affect the climatic control properties of the seat cover.

In an alternative embodiment it is, however, also possible to coat the backing electrically conductive or resistively conductive by pressure, dip, steam coating. or like. Another possibility would be to plasma-treat the fabric as a whole or just the thread to be knitted, in permitting ultrathin electrically conductive coatings to be applied having no negative effect on the climatic control properties of the seat cover. In this case the conductive coating could also be applied to the exposed side of the knit.

BRIEF DESCRIPTION OF THE DRAWINGS

The invention will now be detained by way of example with reference to the drawings in which:

FIG. 1 is front view of a backrest of a vehicular seat,

FIG. 2 is a side view II as shown in FIG. 1,

FIG. 3 is a plan view of the seating surface area of a vehicular seat cover, and FIG. 4 is a section taken along the line IV—IV as shown in FIG. 3.

DETAILED DESCRIPTION

FIG. 1 shows the backrest 10 of a vehicular seat. The backrest 10 contains a substantially upright resting portion 12 and guide portions 14 on both sides of the resting portion 12 for side support of the occupant seated on the seat and reclining against the resting portion 12. The resting portion 12 comprises a back portion 15 which may be designed for discrete or accentuated visual appeal in which the back ply of the knitted seat cover of the backrest 10 consists of thread containing microfibers whilst the facing thread of the seat cover has a dtex exceeding 300 or the filaments of the thread exceeding 30 dtex so that it does not tend to retain moisture, the moisture instead being directed via the microfibers to the backing of the cover where it is removed by airing. Provided somewhat further down at the resting portion 12 in the lumbar region is an insertion pocket 16 integrated by this region being knitted by a preferably four-ply knit in which the two back plies are not joined to the two face plies. The two face plies form the face wall of the pocket comprising a concertina structure to endow it with the necessary elasticity to receive the padding when a lumbar pad is inserted in the part. This concertina structure of the pocket is produced by alternatingly activating and deactivating the needles of the two needle beds in which this region is knitted. If the cover is knitted from one side, the covering portion of the pocket 16 runs in the direction of the wales. The concertina effect is then produced by knitting alternatingly tighter and looser on the front and rear needles. Between this linear non-uniform portion the knit is produced uniformly on both needle beds. Provided at the upper end of the pocket 16 is a slit 18 which is achieved by unlooping the face plies of the insertion pocket 16. Knitted integrated in the seat cover to one side in the backrest is a beaker holder 20 and three pencil holders 22. These parts are available pre-knitted and are transferred and knitting thereinto in knitting the seat cover.

Provided to one side of the backrest 10 is a course 23 including a thread of less and defined burst strength. This course is arranged centrally over an air bag portion of the backrest 10 so that defined bursting of this course is achieved on deployment of the air bag, as a result of which in turn the air bag is able to deploy defined and safely, the course 23 thus producing a defined burst location in the seat cover for the air bag.

Referring now to FIGS. 3 and 4 there is illustrated the seat part 24 of a vehicular seat comprising a seating portion 26 which in turn is surrounded by two side guide portions 28. The front portion 30 of the seat part 24 can be extended forwards, i.e. downwards in the drawing. This is made possible by the concertina structure 32 configured behind this front portion 30. The concertina structure 32 is produced in the same way as the face plies of the insertion pocket 16 as shown in FIG. 1. In the region of the backrest a climate control zone 34 is likewise provided having the same structure and function as the climate control zone 15 evident in FIG. 1.

What is claimed is:

1. A method producing a two-ply knit for a seat cover on a flat bed machine including at least a front needle bed and a rear needle bed, comprising:

defining at least first, second and third groups of wales, with the second group between the first and third groups, knitting tightly with the front needle bed in the first group of wales, with the rear needle bed in the second group of wales, and with the front needle bed in the third group of wales, and knitting loosely with the rear needle bed in the first group of wales, with the front needle bed in the second group of wales, and with the rear needle bed in the third group of wales.

2. A method according to claim 1, comprising defining a fourth group of wales between the first and second groups and knitting uniformly with the front and rear needle beds in the fourth group of wales.

3. A method according to claim 2, wherein the fourth group of wales comprises from five to one hundred wales.

4. A method of producing a two-ply knit for a seat cover on a flat bed machine including at least a front needle bed and a rear needle bed, comprising:

defining at least first, second and third groups of courses, with the second group between the first and third groups, knitting tightly with the front needle bed in the first group of courses, with the rear needle bed in the second group of courses, and with the front needle bed in the third group of courses, and knitting loosely with the rear needle bed in the first group of courses, with the front needle bed in the second group of courses, and with the rear needle bed in the third group of courses.

5. A method according to claim 4, comprising defining a fourth group of courses between the first and second groups and knitting uniformly with the front and rear needle beds in the fourth group of courses.

6. A method according to claim 5, wherein the fourth group of courses comprises from five to one hundred courses.

7. A seat cover including a two-ply knit produced by a method according to claim 1.

8. A seat cover including a two-ply knit produced by a method according to claim 4.

* * * * *